United States Patent [19]
Aoki

[11] Patent Number: 5,579,168
[45] Date of Patent: Nov. 26, 1996

[54] ZOOM LENS SYSTEM WITH GRADIENT INDEX LENS

[75] Inventor: Masayuki Aoki, Oyama, Japan

[73] Assignee: Nikon Corporation, Tokyo, Japan

[21] Appl. No.: 360,080

[22] Filed: Dec. 20, 1994

[30] Foreign Application Priority Data

Dec. 22, 1993 [JP] Japan .................. 5-345621
Dec. 22, 1993 [JP] Japan .................. 5-345622

[51] Int. Cl.$^6$ ................................. G02B 9/00
[52] U.S. Cl. .............. 359/653; 359/775; 359/688
[58] Field of Search ............................ 359/652, 653, 359/683, 687, 688, 774, 775

[56] References Cited

U.S. PATENT DOCUMENTS 5,054,898 10/1991 Kitagishi et al. ................ 359/654

Primary Examiner—Georgia Y. Epps
Assistant Examiner—Dawn-Marie Bey
Attorney, Agent, or Firm—Shapiro and Shapiro

[57] ABSTRACT

A zoom lens system comprises in the following order from the object side: a first lens group of a positive refracting power; a second lens group of a negative refracting power; a third lens group; and a fourth lens group of a positive refracting power, wherein, when changing a focal length of the zoom lens system from a wide-angle end to a telephoto end, the second lens group is shifted in one direction along an optical axis of the zoom lens from the object side toward the image side, the third lens group is shifted so as to reciprocate along the optical axis, and the first lens group has a gradient index lens whose refractive index varies along the direction of the optical axis and which satisfies the following condition:

$$-10.6 < (v2-v1)/[(n2-n1) \cdot 100] < -0.9$$

wherein
n1: a refractive index at an object-side vertex of the gradient index lens,
n2: a refractive index at an image-side vertex of the gradient index lens,
v1: Abbe number at the object-side vertex of the gradient index lens,
v2: Abbe number at the image-side vertex of the gradient index lens.

19 Claims, 6 Drawing Sheets

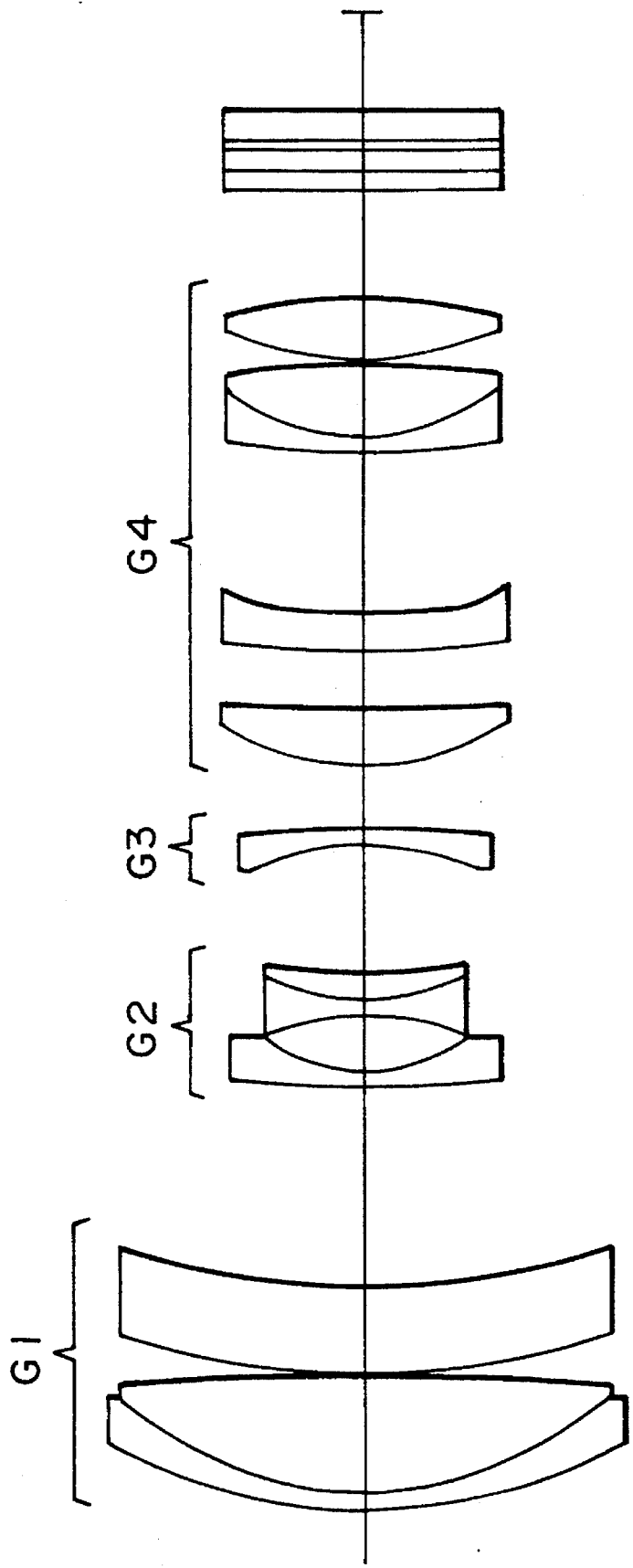
F I G. 4

ZOOM LENS SYSTEM WITH GRADIENT INDEX LENS

BACKGROUND OF THE INVENTION

1. Field of the Invention

The present invention relates to a zoom lens and more particularly to a zoom lens suitable for a video camera, etc.

2. Related Background Art

Conventionally, all zoom lenses for video cameras are formed of a uniform medium lens, and many of those are formed of four lens groups having positive, negative, negative and positive refracting powers or positive, negative, positive and positive refracting power from the object side in that order.

In those zoom lenses having four lens groups, the second lens group and the third lens group or the second lens group and the fourth lens group are shifted along the optical axis in a zooming operation (changing a focal length).

Recently, there have been strong demands for small, lightweight and high performance zoom lenses. In general, as a method of forming small and lightweight zoom lenses, respective powers (refracting powers) of lens groups are made strong.

However, in the conventional zoom lenses formed of the wholly uniform medium lens, as the result of making them small and lightweight, corrections of various aberrations are sacrificed, causing deterioration of imaging performance.

SUMMARY OF THE INVENTION

Therefore, it is an object of the present invention to provide a small, lightweight and high performance zoom lens system by the use of a gradient index lens having a refractive index that varies along the optical axis.

In order to achieve the above and other objects of the present invention, a zoom lens system according to an embodiment of the present invention has, in the following order from the object side:

a first lens group with a positive refracting power;

a second lens group with a negative refracting power;

a third lens group; and a fourth lens group with a positive refracting power, wherein when changing a focal length of the zoom lens system from a wide-angle end to a telephoto end, the second lens group is moved in one direction along an optical axis of the zoom lens from the object side toward the image side, the third lens group is moved so as to reciprocate along the optical axis, and the first lens group has a gradient index lens whose refractive index is varied along a direction of the optical axis and which satisfies the following condition:

$$-10.6 < (v2-v1)/[(n2-n1)\cdot 100] < -0.9 \tag{1}$$

wherein n1: a refractive index at an object-side vertex of the gradient index lens, n2: a refractive index at an image-side vertex of the gradient index lens, v1: Abbe number at the object-side vertex of the gradient index lens, v2: Abbe number at the image-side vertex of the gradient index lens.

A zoom lens system according to another embodiment of the present invention has in the following order from the object side:

a first lens group of a positive refracting power;

a second lens group of a negative refracting power;

a third lens group; and a fourth lens group of a positive refracting power, wherein when changing a focal length of the zoom lens system from a wide-angle end to a telephoto end, the second lens group is moved in one direction along an optical axis of the zoom lens from the object side toward the image side, the third lens group is moved so as to reciprocate along the optical axis, and the first lens group has a gradient index lens whose refractive index is varied along a direction of the optical axis and which satisfies the following condition:

$$0.4 < (v2-v1)/[(n2-n1)\cdot 100] < 1.8 \tag{2}$$

wherein n1: a refractive index at an object-side vertex of the gradient index lens, n2: a refractive index at an image-side vertex of the gradient index lens, v1: Abbe number at an object-side vertex of the gradient index lens, v2: Abbe number at an image-side vertex of the gradient index lens.

In the present invention, the first lens group has the gradient index lens in which there are variations in refractive index along the optical axis. Thus, by utilizing the gradient index lens in the first lens group, it is possible to limit the chromatic aberration in the telephoto end to a small degree, though the chromatic aberration in the telephoto end is an inevitable problem in zoom lenses.

In the zoom lens system according to the first embodiment of the present invention, the gradient index lens of the first lens group satisfies the condition (1). The condition (1) is for defining the relationship between the refractive index and Abbe number at the object-side vertex of the gradient index lens and the refractive index and Abbe number at the image-side vertex thereof to satisfactorily correct the chromatic aberration.

If a range defined by the lower and upper limits of the condition (1) is violated, the secondary spectrum in the chromatic aberration becomes large. Further, it becomes impossible to satisfactorily correct the spherical aberration in the telephoto end preferably.

Also, in the zoom lens system according to the second embodiment of the present invention, the gradient index lens in the first group satisfies the condition (2).

The condition (2) is for defining the relationship between the refractive index and Abbe number at the object-side vertex of the gradient index lens and the refractive index and Abbe number at the image-side vertex thereof to satisfactorily correct the chromatic aberration.

When a range defined by the lower and upper limits of the condition (2) is violated, the secondary spectrum in the chromatic aberration becomes large. Further, it becomes impossible to satisfactorily correct the spherical aberration in the telephoto end.

Further, a zoom lens system according to a third embodiment of the present invention has in the following order from the object side:

a first lens group of a positive refracting power provided so as to be fixed in the direction of an optical axis of the zoom lens when changing a focal length of the zoom lens from a wide-angle end to a telephoto end;

a second lens group of a negative refracting power provided so as to be movable in one direction along the optical axis direction when changing the focal length from the wide-angle end to the telephoto end;

a third lens group provided so as to be able to reciprocate along the optical axis direction when changing the focal length from the wide-angle end to the telephoto end; and a fourth lens group provided so as to be fixed in the optical axis direction when changing the focal length from the wide-angle end to the telephoto end, wherein the first lens group includes a negative lens element, a first positive lens element and a second positive lens element from the object side in that order, and at least one of said first and second positive lens elements is a gradient index lens whose refractive index is varied along the optical axis direction.

In the above-mentioned invention, in order to achieve more preferable imaging performance, the following condition (3) is satisfied:

$$0.03 < |\Delta n| < 0.2 \quad (3)$$

wherein

|Δn|: a value of difference between a maximum refractive index of the gradient index lens with respect to the d-line and a maximum refractive index of the gradient index lens with respect to the d-line.

The condition (3) defines a proper range of the magnitude of a value of difference between a maximum refractive index of the gradient index lens and a minimum refractive index of the gradient index lens.

If the upper limit of the condition (3) is violated, it would be difficult to manufacture the gradient index lens.

On the other hand, if the lower limit of the condition (3) is violated, the ability of the gradient index lens to correct various aberrations is lowered, so the advantage of the gradient index lens becomes meaningless.

Further, in order to achieve more preferable imaging performance, in the present invention, it is preferably to satisfy the following condition (4):

$$D < 10 \quad (4)$$

wherein

D: a depth in which the refractive index of the gradient index lens is varied.

The condition (4) defines a proper range of the depth in which the refractive index of the gradient index lens is varied.

When the upper limit of the condition (4) is violated, it would be difficult to manufacture the gradient index lens.

Also, in the present invention, in order to reduce difficulties in manufacture, it is desirable to vary the refractive index linearly along the optical axis.

Further, in the present invention, more preferable imaging performance can be achieved by utilizing an aspherical surface in the fourth lens group.

BRIEF DESCRIPTION OF THE INVENTION

FIG. 4 shows the structure of a zoom lens system according to a fourth embodiment of the present invention;

DETAILED DESCRIPTION OF THE PREFERRED EMBODIMENTS

In each embodiment of the present invention, a zoom lens has, in the following order from the object side, a first lens group G1 of a positive refracting power, a second lens group G2 of a negative refracting power, a third lens group G3 of a negative or positive refracting power and a fourth lens group G4 of a positive refracting power, and when changing the focal length of the zoom lens from a wide-angle end to a telephoto end, the first and fourth lens groups G1, G4 are fixed, the second lens group G2 is moved in one direction along the optical axis from the object side toward the image side and the third lens group G3 is moved so as to reciprocate along the optical axis.

The embodiments of the present invention will be described with reference to the accompanying drawings.

[First Embodiment]

Figure 1:
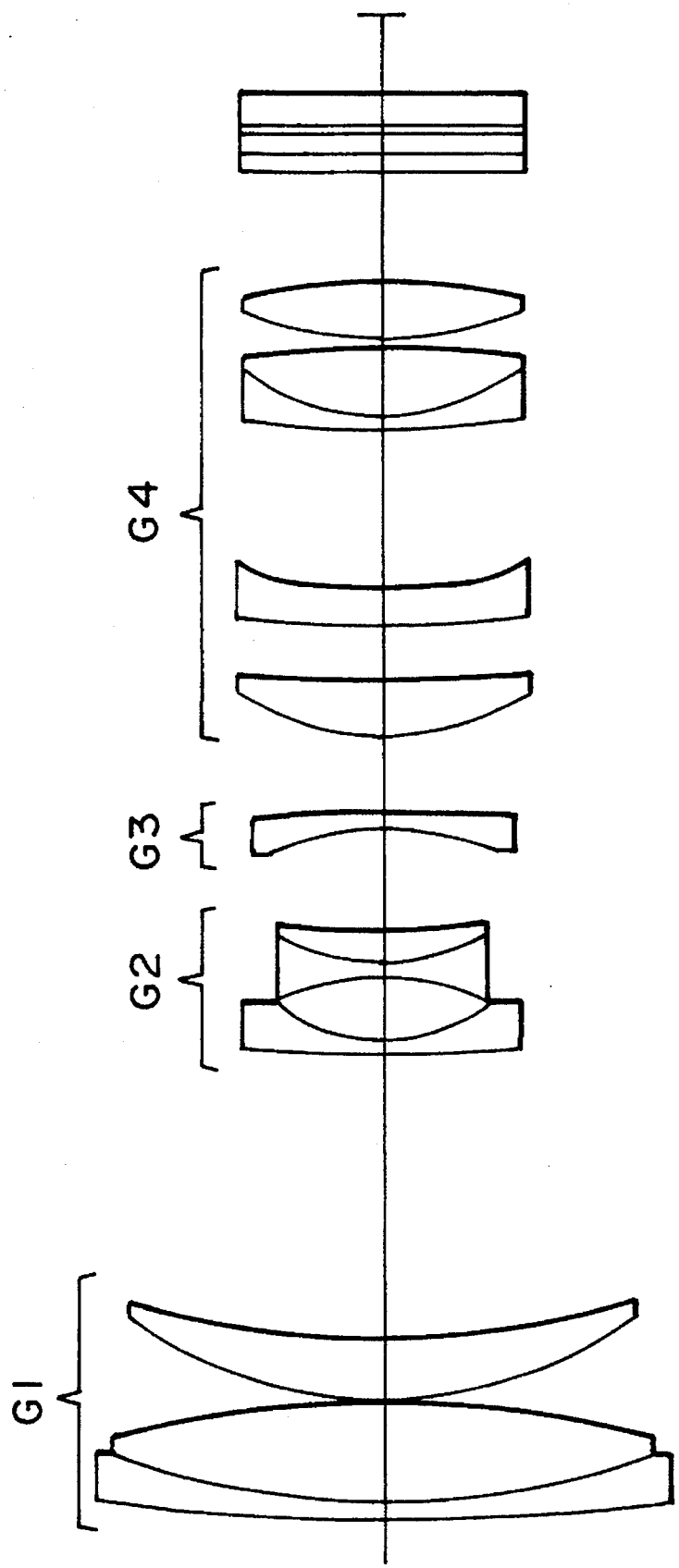
FIG. 1 shows the structure of a zoom lens system according to a first embodiment of the present invention.

FIG. 1 shows the structure of a zoom lens according to the first embodiment of the present invention. The zoom lens has, in the following order from the object side, a first lens group G1 consisting of a cemented lens formed of a negative meniscus lens with a convex surface directed toward the object side and a biconvex lens and a positive meniscus lens with a convex surface directed toward the object side, a second lens group G2 consisting of a cemented lens formed of a negative meniscus lens with a convex surface directed toward the object side, and a cemented lens formed of a biconcave lens and a positive meniscus lens with a convex surface directed toward the object side, a third lens group G3 consisting of a negative meniscus lens with a concave surface directed toward the object side, and a fourth lens group G4 consisting of a positive meniscus lens with a convex surface directed toward the object side, a meniscus lens with a convex surface directed toward the object side and an aspherical surface on the image side, a cemented lens formed of a negative meniscus lens with a convex surface directed toward the object side and a biconvex lens, and a biconvex lens.

FIG. 1 shows the positional relationship of the respective lens groups. When changing the focal length of the zoom lens from the wide-angle end to the telephoto end, the second lens group G2 is moved in one direction along the optical axis from the object side toward the image side and the third lens group G3 is moved so as to reciprocate along the optical axis. At this time, the first and fourth lens groups are fixed.

Values of various elements of the first embodiment of the present invention are shown in the following Table 1. In the Table 1, f and $F_{NO}$ represent the focal length and F-number, respectively. Left end figures indicate the order of the respective lens surfaces from the object side. r represents the radius of curvature of each lens surface and d represents the distance between the adjacent lens surfaces. n and ν respectively represent the refractive index and Abbe number with respect to the d-line (λ=587.6 nm).

Also, plane-parallel plates of various filters are disposed between the final surface of the lenses and the image surface, and since aberration corrections are carried out with these plane-parallel plates included, values for these plane-parallel plates are shown in the Table 1.

Further, the refractive index nj of the gradient index lens (GRIN LENS) with respect to the j-line is expressed by:

$$nj = n0j + n1jx + n2jx^2 + \ldots \quad (5)$$

wherein x: a distance when the object-side vertex of the gradient index lens is considered to be the origin and a direction toward the image surface is the positive direction, n0j: the refractive index of the reference glass with respect to the j-line, n1j, n2j, . . . : gradient index coefficients with respect to the j-line.

Specifically, in the Table, nC represents the refractive index with respect to the C-line (λ=656.3 nm), nd represents the refractive index with respect to the d-line, and nF represents the refractive index with respect to the F-line (λ=486.1 nm).

The aspherical surface is expressed, if the height in a direction perpendicular to the optical axis is y, the displacement in the optical axis direction at the height y is S(y), the reference radius of curvature is R, the conic coefficient is k, and the n-order aspherical coefficient is Cn, as follows:

$$S(y) = (y^2/R)/[1 + (1 - k \cdot y^2/R^2)^{1/2}] + \quad (a)$$
$$C_2 \cdot y^2 + C_4 \cdot y^4 + C_6 \cdot y^6 + C_8 \cdot y^8 + C_{10} \cdot y^{10} + \ldots$$

Also, the paraxial radius of curvature r is defined by:

$$r = 1/(2 \cdot C_2 + 1/R) \quad (b)$$

The aspherical surface is indicated by an asterisk (*) attached to the surface number on the left side thereof.

TABLE 1 f = 9.29 – 52.37
$F_{NO}$ = 1.24 – 1.42

| | r | d | ν | n |
|---|---|---|---|---|
| 1 | 168.892 | 1.20 | 25.5 | 1.80518 |
| 2 | 57.731 | 7.64 | (gradient index lens) | |
| 3 | –82.687 | 0.10 | | |
| 4 | 33.783 | 4.80 | 61.2 | 1.58913 |
| 5 | 74.721 | (d5 = variable) | | |
| 6 | 121.943 | 0.90 | 59.0 | 1.51823 |
| 7 | 12.571 | 4.80 | | |
| 8 | –18.411 | 0.90 | 59.0 | 1.51823 |
| 9 | 16.756 | 2.30 | 25.5 | 1.80518 |
| 10 | 54.952 | (d10 = variable) | | |
| 11 | –23.953 | 1.00 | 59.0 | 1.51823 |
| 12 | –145.136 | (d12 = variable) | | |
| 13 | 19.715 | 4.40 | 55.5 | 1.69680 |
| 14 | 228.515 | 4.29 | | |
| 15 | 91.944 | 3.00 | 57.6 | 1.49108 |
| *16 | 224.917 | 12.07 | | |
| 17 | 68.021 | 1.00 | 23.8 | 1.84666 |
| 18 | 16.822 | 5.50 | 55.5 | 1.69680 |
| 19 | –96.803 | 0.50 | | |
| 20 | 27.242 | 4.60 | 61.2 | 1.58913 |
| 21 | –45.391 | 8.48 | | |
| 22 | ∞ | 1.35 | 70.7 | 1.54440 |
| 23 | ∞ | 1.65 | 64.1 | 1.51680 |
| 24 | ∞ | 0.53 | 70.7 | 1.54440 |
| 25 | ∞ | 2.64 | 70.7 | 1.54440 |
| 26 | ∞ | 6.86 | | |

(variable distance in varying focal length)

| f | 9.29 | 25.36 | 52.37 |
|---|---|---|---|
| d5 | 0.9100 | 20.9100 | 29.6987 |
| d10 | 32.2765 | 7.6310 | 3.4878 |
| d12 | 0.9516 | 5.5971 | 0.9516 |

(aspherical surface data)

| | k | $C_2$ | $C_4$ |
|---|---|---|---|
| 16th surface | 1.0000 | 0.0000 | 0.77949 × 10⁻⁴ |
| | $C_6$ | $C_8$ | $C_{10}$ |
| | 0.15516 × 10⁻⁶ | 0.20807 × 10⁻⁹ | 0.49439 × 10⁻¹¹ |

TABLE 1-continued f = 9.29 – 52.37
$F_{NO}$ = 1.24 – 1.42

(refractive index change data of the gradient index lens)

nC = 1.58619 – 0.01026 x
nd = 1.58913 – 0.01050 x
nF = 1.59581 – 0.01077 x (values corresponding to conditions)

(1) (ν2 – ν1) / [(n2 – n1) · 100] = –3.45
(3) |Δn| = 0.080
(4) D = 7.64

[Second Embodiment]

Figure 2:
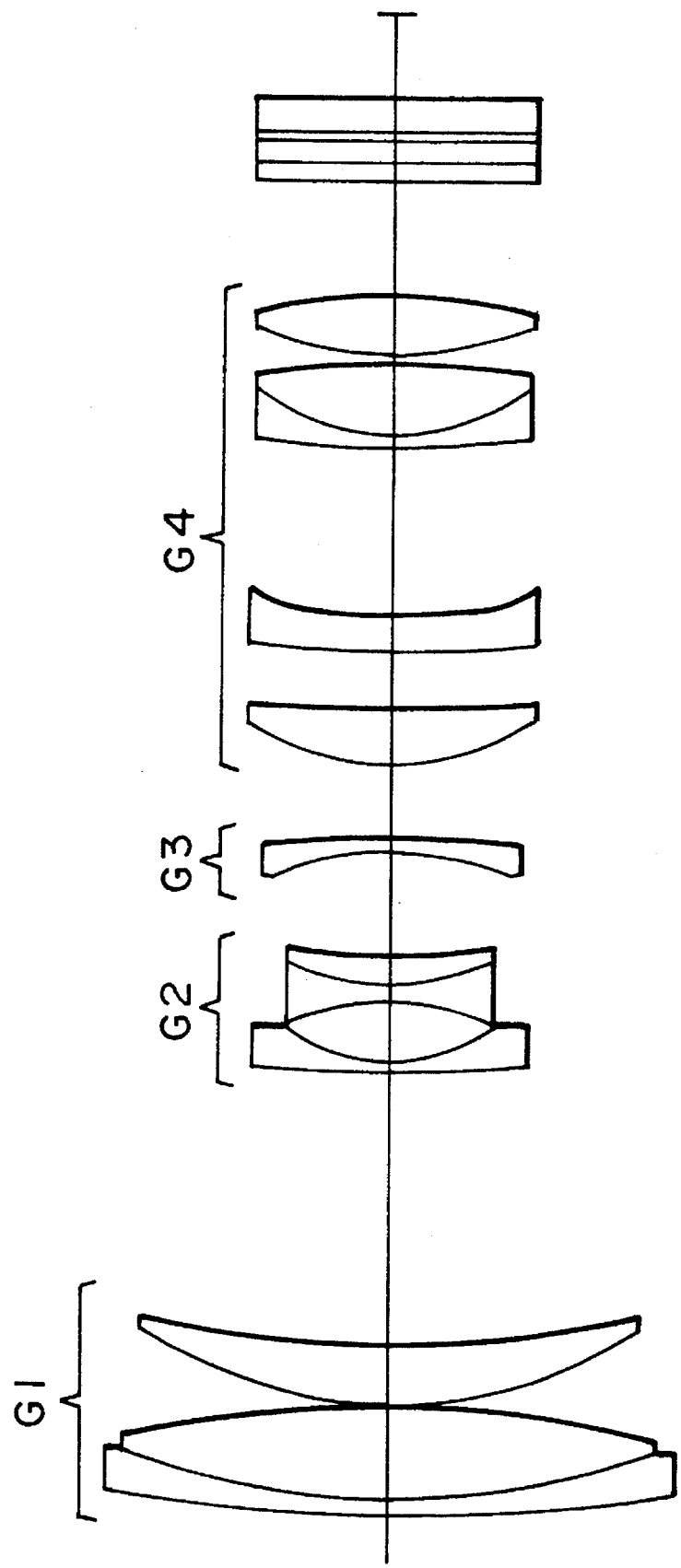
FIG. 2 shows the structure of a zoom lens system according to a second embodiment of the present invention.

FIG. 2 shows the structure of a zoom lens according to the second embodiment of the present invention.

The zoom lens has, in the following order from the object side, a first lens group G1 consisting of a cemented lens formed of a negative meniscus lens with a convex surface directed toward the object side and a biconvex lens and a positive meniscus lens with a convex surface directed toward the object side, a second lens group G2 consisting of a negative meniscus lens with a convex surface directed toward the object side, and a cemented lens formed of a biconcave lens and a positive meniscus lens with a convex surface directed toward the object side, a third lens group G3 consisting of a negative meniscus lens with a concave surface directed toward the object side, and fourth lens group G4 consisting of a positive meniscus lens with a convex surface directed toward the object side, a meniscus lens with a convex surface directed toward the object side and an aspherical surface on the image side, a cemented lens formed of a negative meniscus lens with a convex surface directed toward the object side and a biconvex lens, and a biconvex lens.

FIG. 2 shows the positional relationship of the respective lens groups. When changing the focal length of the zoom lens from a wide-angle end to a telephoto end, the second lens group G2 is moved in one direction along the optical axis from the object side toward the image side and the third lens group G3 is moved so as to reciprocate along the optical axis. At this time, the first and fourth lens groups G1, G4 are fixed.

The zoom lens system of the second embodiment has the same structure as the zoom lens system of the first embodiment.

Values of various elements of the second embodiment of the present invention are shown in the following Table 2. In the Table 2, f and $F_{NO}$ represent the focal length and F-number, respectively. Left end figures indicate the order of the respective lens surfaces from the object side. r represents the radius of curvature of each lens surface and d represents the distances between the adjacent lens surfaces. n and ν respectively represent the refractive index and Abbe number with respect to the d-line (λ=587.6 nm).

Also, plane-parallel plates of various filters are disposed between the final surface of the lenses and the image surface, and since aberration corrections are carried out with these plane-parallel plates included, values for these plane-parallel plates are shown in the Table 2.

TABLE 2 f = 9.26 – 52.38
$F_{NO} = 1.24 - 1.42$

|   | r | d | ν | n |
|---|---|---|---|---|
| 1 | 137.342 | 1.20 | 25.5 | 1.80518 |
| 2 | 57.152 | 7.40 | (gradient index lens) | |
| 3 | –78.948 | 0.10 | | |
| 4 | 34.737 | 4.76 | 61.2 | 1.58913 |
| 5 | 90.553 | (d5 = variable) | | |
| 6 | 121.943 | 0.90 | 59.0 | 1.51823 |
| 7 | 12.571 | 4.80 | | |
| 8 | –18.411 | 0.90 | 59.0 | 1.51823 |
| 9 | 16.756 | 2.30 | 25.5 | 1.80518 |
| 10 | 54.952 | (d10 = variable) | | |
| 11 | –23.953 | 1.00 | 59.0 | 1.51823 |
| 12 | –145.136 | (d12 = variable) | | |
| 13 | 19.715 | 4.40 | 55.5 | 1.69680 |
| 14 | 228.515 | 4.29 | | |
| 15 | 91.944 | 3.00 | 57.6 | 1.49108 |
| *16 | 224.917 | 12.07 | | |
| 17 | 68.021 | 1.00 | 23.8 | 1.84666 |
| 18 | 16.822 | 5.50 | 55.5 | 1.69680 |
| 19 | –96.803 | 0.50 | | |
| 20 | 27.242 | 4.60 | 61.2 | 1.58913 |
| 21 | –45.391 | 8.48 | | |
| 22 | ∞ | 1.35 | 70.7 | 1.54440 |
| 23 | ∞ | 1.65 | 64.1 | 1.51680 |
| 24 | ∞ | 0.53 | 70.7 | 1.54440 |
| 25 | ∞ | 2.64 | 70.7 | 1.54440 |
| 26 | ∞ | 6.85 | | |

(variable distance in varying focal length)

| f | 9.26 | 25.22 | 52.38 |
|---|---|---|---|
| d5 | 1.1100 | 21.1100 | 29.9797 |
| d10 | 32.3576 | 7.7121 | 3.4878 |
| d12 | 0.9516 | 5.5971 | 0.9516 |

(aspherical surface data)

| | k | $C_2$ | $C_4$ |
|---|---|---|---|
| 16th surface | 1.0000 | 0.0000 | $0.77949 \times 10^{-4}$ |
| | $C_6$ | $C_8$ | $C_{10}$ |
| | $0.15516 \times 10^{-6}$ | $0.20807 \times 10^{-9}$ | $0.49439 \times 10^{-11}$ |

(refractive index change data of the gradient index lens)

$$nC = 1.51432 - 0.01003 \times$$
$$nd = 1.51680 - 0.01029 \times$$
$$nF = 1.52238 - 0.01063 \times$$

(values corresponding to conditions)

(1) $(v2 - v1) / [(n2 - n1) \cdot 100] = -7.57$
(3) $|\Delta n| = 0.076$
(4) $D = 7.40$

[Third Embodiment]

Figure 3:
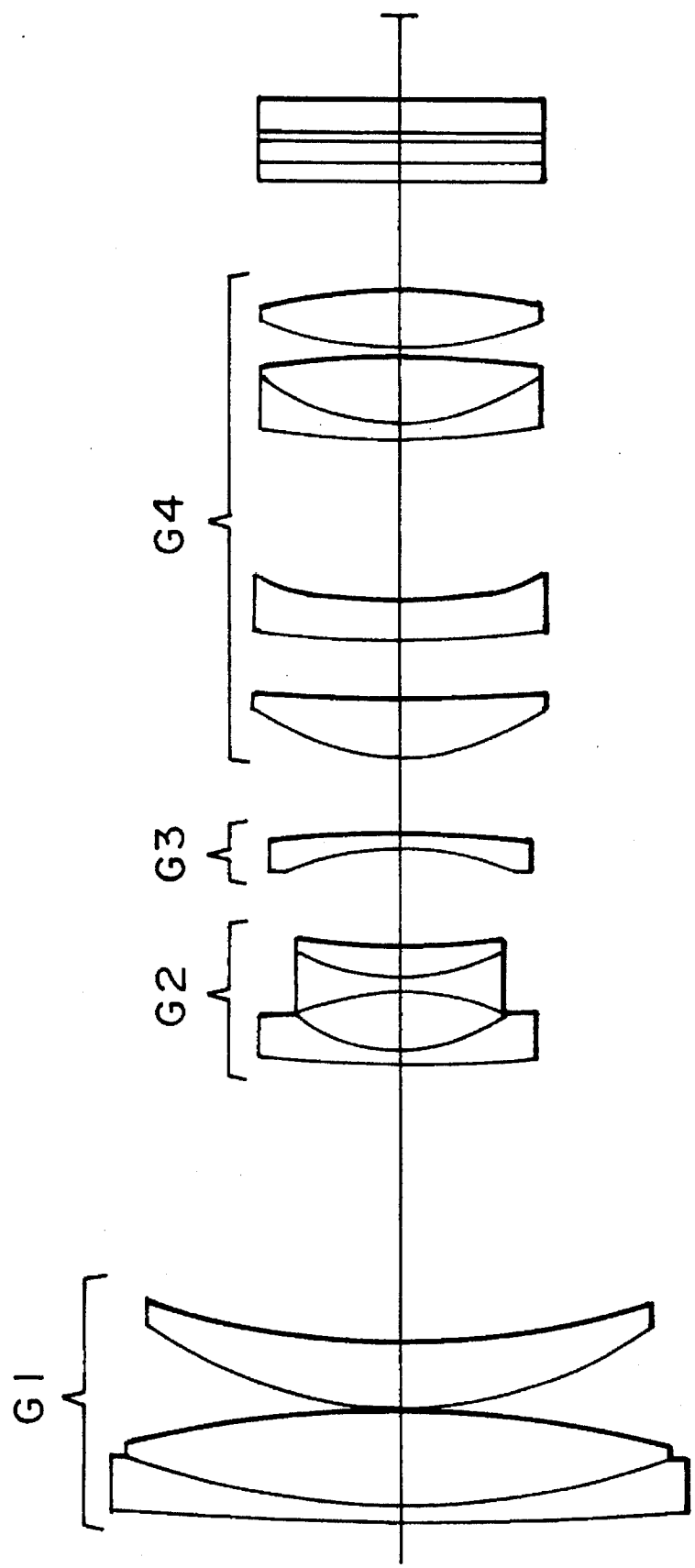
FIG. 3 shows the structure of a zoom lens system according to a third embodiment of the present invention.

FIG. 3 shows the structure of a zoom lens according to the third embodiment of the present invention. The zoom lens has, in the following order from the object side, a first lens group Gt consisting of a cemented lens formed of a negative meniscus lens with a convex surface directed toward the object side and a biconvex lens and a positive meniscus lens with a convex surface directed toward the object side, a second lens group G2 consisting of a negative meniscus lens with a convex surface directed toward the object side, and a cemented lens formed of a biconvex lens and a positive meniscus lens with a convex surface directed toward the object side, a third lens group G3 consisting of a negative meniscus lens with a concave surface directed toward the object side, and a fourth lens group G4 consisting of a positive meniscus lens with a convex surface directed toward the object side, a meniscus lens with a convex surface directed toward the object side and an aspherical surface on the image side, a cemented lens formed of a negative meniscus lens with a convex surface directed toward the object side and a biconvex lens, and a biconvex lens.

FIG. 3 shows the positional relationship of the respective lens groups. When changing the focal length of the zoom lens from a wide-angle end to a telephoto end, the second lens group G2 is moved in one direction along the optical axis from the object side toward the image side and the third lens group G3 is moved so as to reciprocate along the optical axis. At this time, the first and fourth lens groups G1, G4 are fixed.

The zoom lens system of the third embodiment has the same structure as the zoom lens system of the first embodiment.

Values of various elements of the third embodiment of the present invention are shown in the following Table 3. In the Table 3, f and $F_{NO}$ represent the focal length and F-number respectively. Left end figures indicate the order of the respective lens surfaces from the object side. r represents the radius of curvature of each lens surface and d represents the distances between the adjacent lens surfaces. n and ν respectively represent the refractive index and Abbe number with respect to the d-line (λ=587.6 nm).

Also, plane-parallel plates of various filters are disposed between the final surface of the lenses and the image surface, and since aberration corrections are carried out with these plane-parallel plates included, values for these plane-parallel plates are shown in the Table 3.

TABLE 3 f = 9.42 – 52.38
$F_{NO} = 1.24 - 1.42$

|   | r | d | ν | n |
|---|---|---|---|---|
| 1 | 264.191 | 1.20 | 25.5 | 1.80518 |
| 2 | 58.000 | 7.40 | (gradient index lens) | |
| 3 | –88.702 | 0.10 | | |
| 4 | 32.824 | 5.00 | 61.2 | 1.58913 |
| 5 | 61.965 | (d5 = variable) | | |
| 6 | 121.743 | 0.90 | 59.0 | 1.51823 |
| 7 | 12.571 | 4.80 | | |
| 8 | –18.411 | 0.90 | 59.0 | 1.51823 |
| 9 | 16.756 | 2.30 | 25.5 | 1.80518 |
| 10 | 54.952 | (d10 = variable) | | |
| 11 | –23.953 | 1.00 | 59.0 | 1.51823 |
| 12 | –145.136 | (d12 = variable) | | |
| 13 | 19.715 | 4.40 | 55.5 | 1.69680 |
| 14 | 228.515 | 4.29 | | |
| 15 | 91.944 | 3.00 | 57.6 | 1.49108 |
| *16 | 224.917 | 12.07 | | |
| 17 | 68.021 | 1.00 | 23.8 | 1.84666 |
| 18 | 16.822 | 5.50 | 55.5 | 1.69680 |
| 19 | –96.803 | 0.50 | | |
| 20 | 27.242 | 4.60 | 61.2 | 1.58913 |
| 21 | –45.391 | 8.48 | | |
| 22 | ∞ | 1.35 | 70.7 | 1.54440 |
| 23 | ∞ | 1.65 | 64.1 | 1.51680 |
| 24 | ∞ | 0.53 | 70.7 | 1.54440 |
| 25 | ∞ | 2.64 | 70.7 | 1.54440 |
| 26 | ∞ | 6.85 | | |

(variable distance in varying focal length)

| f | 9.42 | 26.01 | 52.38 |
|---|---|---|---|
| d5 | 0.9100 | 20.9100 | 29.3207 |
| d10 | 31.7885 | 7.2315 | 3.4878 |
| d12 | 1.0616 | 5.6186 | 0.9516 |

(aspherical surface data)

| | k | $C_2$ | $C_4$ |
|---|---|---|---|
| 16th | 1.0000 | 0.0000 | $0.77949 \times 10^{-4}$ |

TABLE 3-continued $f = 9.42 - 52.38$
$F_{NO} = 1.24 - 1.42$

| surface | $C_6$ | $C_8$ | $C_{10}$ |
|---|---|---|---|
| | $0.15516 \times 10^{-6}$ | $0.20807 \times 10^{-9}$ | $0.49439 \times 10^{-11}$ |

(refractive index change data of the gradient index lens)

$nC = 1.69297 - 0.01109 \times$
$nd = 1.69680 - 0.01133 \times$
$nF = 1.70553 - 0.01158 \times$ (values corresponding to conditions)

(1) $(\nu2 - \nu1) / [(n2 - n1) \cdot 100] = -1.57$
(3) $|\Delta n| = 0.084$
(4) $D = 7.40$

[Fourth Embodiment]

FIG. 4 shows the structure of a zoom lens according to the fourth embodiment of the present invention.

The zoom lens has, in the following order from the object side, a first lens group G1 consisting of a cemented lens formed of a negative meniscus lens with a convex surface directed toward the object side and the biconvex lens and a positive meniscus lens with a convex surface directed toward the object side, a second lens group G2 consisting of a negative meniscus lens with a convex surface directed toward the object side, and a cemented lens formed of a biconcave lens and a positive meniscus lens with a convex surface directed toward the object side, a third lens group G3 consisting of a negative meniscus lens with a concave surface directed toward the object side, and a fourth lens group G4 consisting of a positive meniscus lens with a convex surface directed toward the object side, a meniscus lens with a convex surface directed toward the object side and an aspherical surface on the image side, a cemented lens formed of a negative meniscus lens with a convex surface directed toward the object side and a biconvex lens, and a biconvex lens.

FIG. 4 shows the positional relationship of the respective lens groups. When changing the focal length of the zoom lens from a wide-angle end to a telephoto end, the second lens group G2 is moved in one direction along the optical axis from the object side toward the image side and the third lens group G3 is moved so as to reciprocate along the optical axis. At this time, the first and fourth lens groups G1, G4 are fixed.

Values of various elements of the fourth embodiment of the present invention are shown in the following Table 4. In the Table 4, f and $F_{NO}$ represent the focal length and F-number respectively. Left end figures indicate the order of the respective lens surfaces from the object side. r represents the radius of curvature of each lens surface and d represents the distances between the adjacent lens surfaces. n and $\nu$ respectively represent the refractive index and Abbe number with respect to the d-line ($\lambda$=587.6 nm).

Also, plane-parallel plates of various filters are disposed between the final surface of the lenses and the image surface, and since aberration corrections are carried out with these plane-parallel plates included, values for these plane-parallel plates are shown in the Table 4.

TABLE 4

$f = 11.59 - 49.93$
$F_{NO} = 1.24 - 1.42$

| | r | d | $\nu$ | n |
|---|---|---|---|---|
| 1 | 41.533 | 1.20 | 25.5 | 1.80518 |
| 2 | 27.781 | 9.50 | 61.2 | 1.58913 |
| 3 | −336.540 | 0.10 | | |
| 4 | 54.264 | 7.28 | (gradient index lens) | |
| 4 | 58.967 | (d5 = variable) | | |
| 6 | 121.943 | 0.90 | 59.0 | 1.51823 |
| 7 | 12.571 | 4.80 | | |
| 8 | −18.411 | 0.90 | 59.0 | 1.51823 |
| 9 | 16.756 | 2.30 | 25.5 | 1.80518 |
| 10 | 54.952 | (d10 = variable) | | |
| 11 | −23.953 | 1.00 | 59.0 | 1.51823 |
| 12 | −145.136 | (d12 = variable) | | |
| 13 | 19.715 | 4.40 | 55.5 | 1.69680 |
| 14 | 228.515 | 4.29 | | |
| 15 | 91.944 | 3.00 | 57.6 | 1.49108 |
| *16 | 224.917 | 12.07 | | |
| 17 | 68.021 | 1.00 | 23.8 | 1.84666 |
| 18 | 16.822 | 5.50 | 55.5 | 1.69680 |
| 19 | −96.803 | 0.50 | | |
| 20 | 27.242 | 4.60 | 61.2 | 1.58913 |
| 21 | −45.391 | 8.48 | | |
| 22 | ∞ | 1.35 | 70.7 | 1.54440 |
| 23 | ∞ | 1.65 | 64.1 | 1.51680 |
| 24 | ∞ | 0.53 | 70.7 | 1.54440 |
| 25 | ∞ | 2.64 | 70.7 | 1.54440 |
| 26 | ∞ | 6.45 | | |

(variable distance in varying focal length)

| f | 11.59 | 26.75 | 49.93 |
|---|---|---|---|
| d5 | 0.9100 | 15.9100 | 23.1269 |
| d10 | 27.0547 | 9.5047 | 6.4878 |
| d12 | 2.6016 | 5.1516 | 0.9516 |

(aspherical surface data)

| | k | $C_2$ | $C_4$ |
|---|---|---|---|
| 16th surface | 1.0000 | 0.0000 | $0.77949 \times 10^{-4}$ |
| | $C_6$ | $C_8$ | $C_{10}$ |
| | $0.15516 \times 10^{-6}$ | $0.20807 \times 10^{-9}$ | $0.49439 \times 10^{-11}$ |

(refractive index change data of the gradient index lens)

$nC = 1.58619 - 0.01984 \times$
$nd = 1.58913 - 0.01976 \times$
$nF = 1.59581 - 0.01995 \times$ (values corresponding to conditions)

(2) $(\nu2 - \nu1) / [(n2 - n1) \cdot 100] = 0.75$
(3) $|\Delta n| = 0.144$
(4) $D = 7.28$

[Fifth Embodiment]

Figure 5:
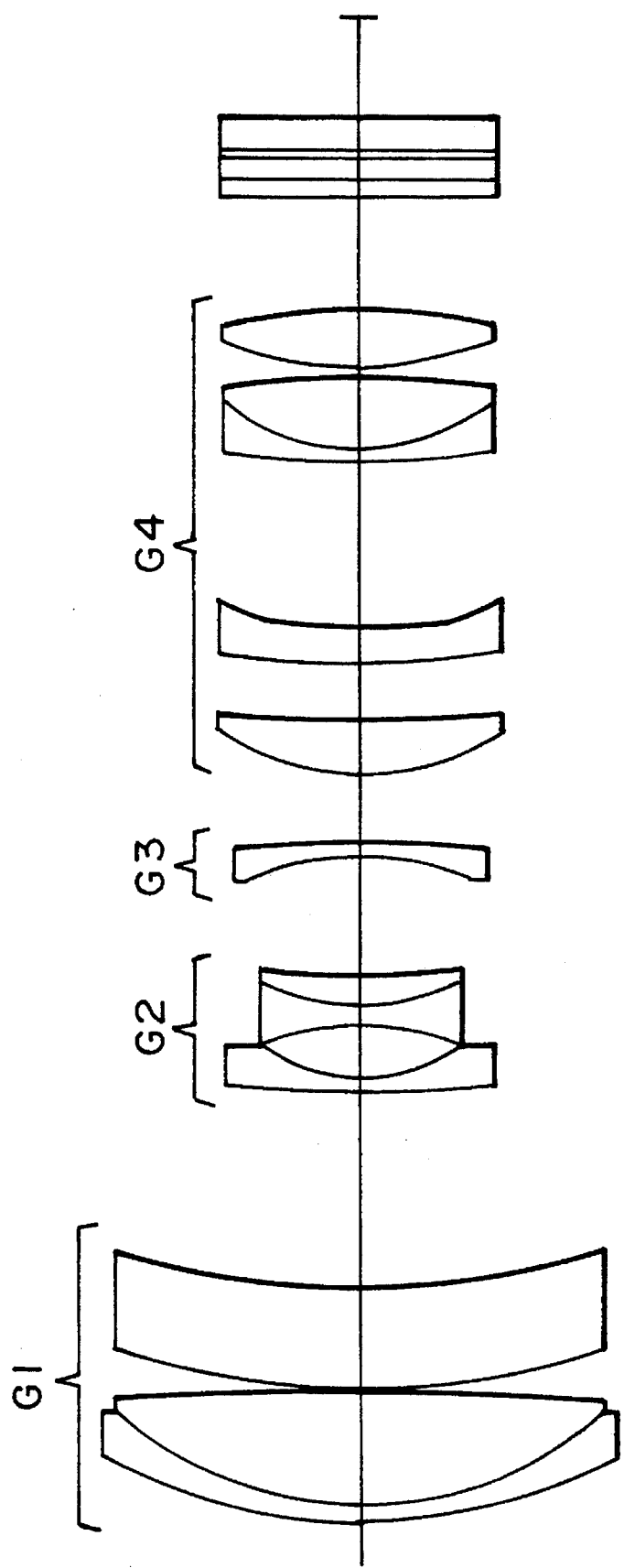
FIG. 5 shows the structure of a zoom lens system according to a fifth embodiment of the present invention.

FIG. 5 shows the structure of a zoom lens according to the fifth embodiment of the present invention.

The zoom lens has, in the following order from the object side, a first lens group G1 consisting of a cemented lens formed of a negative meniscus lens with a convex surface directed toward the object side and a biconvex lens and a positive meniscus lens with a convex surface directed toward the object side, a second lens group G2 consisting of a cemented lens formed of a negative meniscus lens with a convex surface directed toward the object side, a biconcave lens and a positive meniscus lens with a convex surface directed toward the object side, a third lens group G3 consisting of a negative meniscus lens with a concave surface directed toward the object side, and a fourth lens group G4 consisting of a positive meniscus lens with a convex surface directed toward the object side, a meniscus lens with a convex surface directed toward the object side and an aspherical surface on the image side, a cemented lens formed of a negative meniscus lens with a convex surface directed toward the object side and a biconvex lens and a biconvex lens.

FIG. 5 shows the positional relationship of the respective lens groups. When changing the focal length of the zoom lens from a wide-angle end to a telephoto end, the second lens group G2 is moved in one direction along the optical axis from the object side toward the image side and the third lens group G3 is moved so as to reciprocate along the optical axis. At this time, the first and fourth lens groups G1, G4 are fixed.

The zoom lens system of the fifth embodiment has the same structure as the zoom lens system of the fourth embodiment.

Values of various elements of the fifth embodiment of the present invention are shown in the following Table 5. In the Table 5, f and $F_{NO}$ represent the focal length and F-number respectively. Left end figures indicate the order of the respective lens surfaces from the object side. r represents the radius of curvature of each lens surface and d represents the distances between the adjacent lens surfaces. n and ν respectively represent the refractive index and Abbe number with respect to the d-line (λ=587.6 nm).

Also, plane-parallel plates of various filters are disposed between the final surface of the lenses and the image surface, and since aberration corrections are carried out with these plane-parallel plates included, values for these plane-parallel plates are shown in the Table 5.

TABLE 5

$f = 11.88 - 49.94$
$F_{NO} = 1.24 - 1.42$

| | r | d | ν | n |
|---|---|---|---|---|
| 1 | 42.473 | 1.20 | 25.5 | 1.80518 |
| 2 | 28.319 | 9.38 | 61.2 | 1.58913 |
| 3 | −346.625 | 0.10 | | |
| 4 | 56.643 | 8.27 | (gradient index lens) | |
| 5 | 59.548 | (d5 = variable) | | |
| 6 | 121.943 | 0.90 | 59.0 | 1.51823 |
| 7 | 12.571 | 4.80 | | |
| 8 | −18.411 | 0.90 | 59.0 | 1.51823 |
| 9 | 16.756 | 2.30 | 25.5 | 1.80518 |
| 10 | 54.952 | (d10 = variable) | | |
| 11 | −23.953 | 1.00 | 59.0 | 1.81823 |
| 12 | −145.136 | (d12 = variable) | | |
| 13 | 19.715 | 4.40 | 55.5 | 1.69680 |
| 14 | 228.515 | 4.29 | | |
| 15 | 91.944 | 3.00 | 57.6 | 1.49108 |
| *16 | 224.917 | 12.07 | | |
| 17 | 68.021 | 1.00 | 23.8 | 1.84666 |
| 18 | 16.822 | 5.50 | 55.5 | 1.69680 |
| 19 | −96.803 | 0.50 | | |
| 20 | 27.242 | 4.60 | 61.2 | 1.58913 |
| 21 | −45.391 | 8.48 | | |
| 22 | ∞ | 1.35 | 70.7 | 1.54440 |
| 23 | ∞ | 1.65 | 64.1 | 1.51680 |
| 24 | ∞ | 0.53 | 70.7 | 1.54440 |
| 25 | ∞ | 2.64 | 70.7 | 1.54440 |
| 26 | ∞ | 6.44 | | |

(variable distance in varying focal length)

| f | 11.88 | 28.88 | 49.94 |
|---|---|---|---|
| d5 | 0.9100 | 15.9100 | 22.5520 |
| d10 | 26.3098 | 8.9698 | 6.4878 |
| d12 | 2.7716 | 5.1116 | 0.9516 |

(aspherical surface data)

| | k | $C_2$ | $C_4$ |
|---|---|---|---|
| 16th | 1.0000 | 0.0000 | $0.77949 \times 10^{-4}$ |

TABLE 5-continued $f = 11.88 - 49.94$
$F_{NO} = 1.24 - 1.42$

| surface | $C_6$ | $C_8$ | $C_{10}$ |
|---|---|---|---|
| | $0.15516 \times 10^{-6}$ | $0.20807 \times 10^{-9}$ | $0.49439 \times 10^{-11}$ |

(refractive index change data of the gradient index lens)

nC = 1.69297 − 0.01966 ×
nd = 1.69680 − 0.01989 ×
nF = 1.70553 − 0.02003 ×

(values corresponding to conditions)

(2) (ν2 − ν1) / [(n2 − n1) · 100] = 0.67
(3) |Δn| = 0.164
(4) D = 8.27

[Sixth Embodiment]

Figure 6:
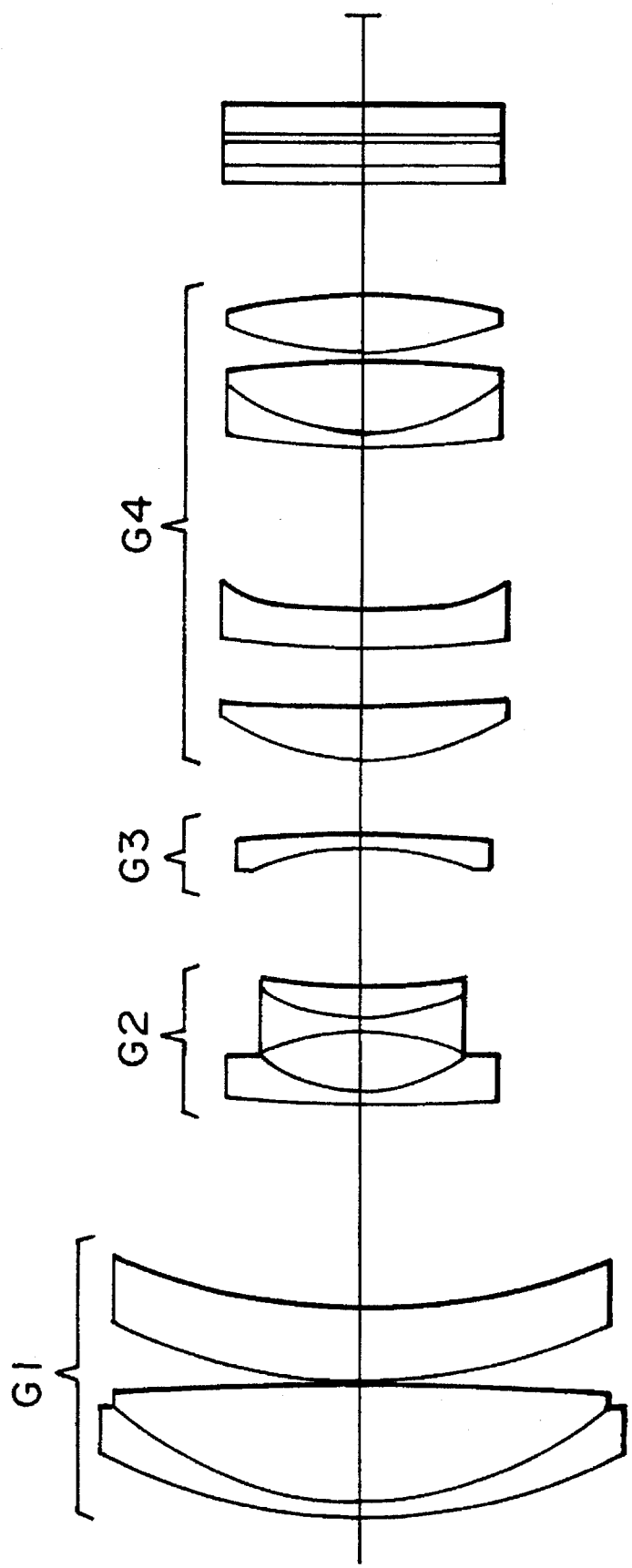
FIG. 6 shows the structure of a zoom lens system according to a sixth embodiment of the present invention.

FIG. 6 shows the structure of a zoom lens according to the sixth embodiment of the present invention.

The zoom lens has, in the following order from the object side, a first lens group G1 consisting of a cemented lens formed of a negative meniscus lens with a convex surface directed toward the object side and a biconvex lens and a positive meniscus lens with a convex surface directed toward the object side, a second lens group G2 consisting of a negative meniscus lens with a convex surface directed toward the object side, and a cemented lens formed of a biconcave lens and a positive meniscus lens with a convex surface directed toward the object side, a third lens group G3 consisting of a negative meniscus lens with a concave surface directed toward the object side, a fourth lens group G4 consisting of a positive meniscus lens with a convex surface directed toward the object side, a meniscus lens with a convex surface directed toward the object side and an aspherical surface on the image side, a cemented lens formed of a negative meniscus lens with a convex surface directed toward the object side and a biconvex lens, and a biconvex lens.

FIG. 6 shows the positional relationship of the respective lens groups. When changing the focal length of the zoom lens from a wide-angle end to a telephoto end, the second lens group G2 is moved in one direction along the optical axis from the object side toward the image side and the third lens group G3 is moved so as to reciprocate along the optical axis. At this time, the first and fourth lens groups G1, G4 are fixed.

The zoom lens system of the sixth embodiment has the same structure as the zoom lens system of the fourth embodiment.

Values of various elements of the sixth embodiment of the present invention are shown in the following Table 6. In the Table 6, f and $F_{NO}$ represent the focal length and F-number respectively. Left end figures indicate the order of the respective lens surfaces from the object side. r represents the radius of curvature of each lens surface and d represents the distances between the adjacent lens surfaces. n and ν respectively represent the refractive index and Abbe number with respect to the d-line (ν=587.6 nm).

Also, plane-parallel plates of various filters are disposed between the final surface of the lenses and the image surface, and since aberration corrections are carried out with these plane-parallel plates included, values for these plane-parallel plates are shown in the Table 6.

TABLE 6

| | f = 11.04 – 49.93 | | |
|---|---|---|---|
| | $F_{NO}$ = 1.24 – 1.42 | | |
| r | d | ν | n |
| 1  43.524 | 1.20 | 25.5 | 1.80518 |
| 2  28.433 | 9.52 | 61.2 | 1.59813 |
| 3  −260.817 | 0.10 | | |
| 4  44.747 | 5.88 | (gradient index lens) | |
| 5  50.421 | (d5 = variable) | | |
| 6  121.943 | 0.90 | 59.0 | 1.51823 |
| 7  12.571 | 4.80 | | |
| 8  −18.411 | 0.90 | 59.0 | 1.51823 |
| 9  16.756 | 2.30 | 25.5 | 1.80518 |
| 10  54.952 | (d10 = variable) | | |
| 11  −23.953 | 1.00 | 59.0 | 1.51823 |
| 12  −145.136 | (d12 = variable) | | |
| 13  19.715 | 4.40 | 55.5 | 1.69680 |
| 14  228.515 | 4.29 | | |
| 15  91.944 | 3.00 | 57.6 | 1.49108 |
| *16  224.917 | 12.07 | | |
| 17  68.021 | 1.00 | 23.8 | 1.84666 |
| 18  16.822 | 5.50 | 55.5 | 1.69680 |
| 19  −96.803 | 0.50 | | |
| 20  27.242 | 4.60 | 61.2 | 1.58913 |
| 21  −45.391 | 8.48 | | |
| 22  ∞ | 1.35 | 70.7 | 1.54440 |
| 23  ∞ | 1.65 | 64.1 | 1.51680 |
| 24  ∞ | 0.53 | 70.7 | 1.54440 |
| 25  ∞ | 2.64 | 70.7 | 1.54440 |
| 26  ∞ | 6.44 | | |

(variable distance in varying focal length)

| f | 11.04 | 24.77 | 49.93 |
|---|---|---|---|
| d5 | 0.9100 | 15.9100 | 24.2174 |
| d10 | 28.3952 | 10.4952 | 6.4878 |
| d12 | 2.3516 | 5.2516 | 0.9516 |

(aspherical surface data)

| | k | $C_2$ | $C_4$ |
|---|---|---|---|
| 16th surface | 1.0000 | 0.0000 | $0.77949 \times 10^{-4}$ |
| | $C_6$ | $C_8$ | $C_{10}$ |
| | $0.15516 \times 10^{-6}$ | $0.20807 \times 10^{-9}$ | $0.49439 \times 10^{-11}$ |

(refractive index change data of the gradient index lens)

nC = 1.79611 − 0.007572 x
nd = 1.80518 − 0.007144 x
nF = 1.82773 − 0.006483 x (values corresponding to conditions)

(2) (ν2 − ν1) / [(n2 − n1) · 100] = 1.28
(3) |Δn| = 0.042
(4) D = 5.88

As described above, in each of the above-described embodiments of the present invention, the degree of freedom in designing can be increased by the use of the gradient index lens having a refractive index that varies along optical axis, which has an advantage of high practicability with present processing technique. Therefore, in each embodiment of the present invention, it is possible to realize a small, lightweight and high-performance zoom lens.

What is claimed is:

1. A zoom lens system comprising in the following order from the object side:

a first lens group of a positive refracting power;

a second lens group of a negative refracting power;

a third lens group; and a fourth lens group of a positive refracting power, wherein, when changing a focal length of said zoom lens system from a wide-angle end to a telephoto end, said second lens group moves in one direction along an optical axis of said zoom lens from the object side toward the image side and said third lens group moves so as to reciprocate along the optical axis, and said first lens group has a gradient index lens whose refractive index varies along the optical axis and which satisfies the following condition:

−10.6 < (ν2−ν1)/[(n2−n1)·100] < −0.9 wherein n1: a refractive index with respect to d-line at an object-side vertex of said gradient index lens, n2: a refractive index with respect to d-line at an image-side vertex of said gradient index lens, ν1: Abbe number with respect to d-line at the object-side vertex of said gradient index lens, ν2: Abbe number with respect to d-line at the image-side vertex of said gradient index lens.

2. A zoom lens system according to claim 1, wherein a |Δn| of satisfies:

0.03 < |Δn| < 0.2 wherein |Δn| is a difference between a maximum refractive index of the gradient index lens with respect to the d-line and a minimum refractive index of the gradient index lens with respect to the d-line.

3. A zoom lens system according to claim 1, wherein a depth D in which the refractive index of said gradient index lens is varied satisfies:

D < 10.

4. A zoom lens system according to claim 1, wherein the refractive index of said gradient index lens varies linearly along the optical axis.

5. A zoom lens system according to claim 1, wherein said first lens group has at least two sub-lens groups and said gradient index lens is disposed in one of said at least two sub-lens groups which is located closest to the object side.

6. A zoom lens system according to claim 1, wherein at least one of a plurality of lens elements constituting said fourth lens group has an aspherical surface.

7. A zoom lens system according to claim 1, wherein said first and fourth lens groups do not move along the optical axis when the focal length of said zoom lens system changes from the wide-angle end to the telephoto end.

8. A zoom lens system comprising in the following order from the object side:

a first lens group of a positive refracting power;

a second lens group of a negative refracting power;

a third lens group; and a fourth lens group of a positive refracting power, wherein, when changing a focal length of said zoom lens system from a wide-angle end to a telephoto end, said second lens group moves in one direction along an optical axis of said zoom lens system from the object side toward the image side and said third lens group moves so as to reciprocate along the optical axis, and said first lens group has a gradient index lens whose refractive index varies along the optical axis and which satisfies the following condition:

0.4 < (ν2−ν1)/[(n2−n1)·100] < 1.8 wherein n1: a refractive index with respect to d-line at an object-side vertex of said gradient index lens, n2: a refractive index with respect to d-line at an image-side vertex of said gradient index lens, v1: Abbe number with respect to d-line at the object-side vertex of said gradient index lens, v2: Abbe number with respect to d-line at the image-side vertex of said gradient index lens.

9. A zoom lens system according to claim 8, wherein |Δn| of satisfies:

$$0.03 < |\Delta n| < 0.2$$

wherein |Δn| is a difference between a maximum refractive index of the gradient index lens with respect to the d-line and a minimum refractive index of the gradient index lens with respect to the d-line.

10. A zoom lens system according to claim 8, wherein a depth D in which the refractive index of said gradient index lens is varied satisfies:

$$D < 10.$$

11. A zoom lens system according to claim 8, wherein the refractive index of said gradient index lens varies linearly along the optical axis.

12. A zoom lens system according to claim 8, wherein said first lens group has at least two sub-lens groups and said gradient index lens is disposed in one of said at least two sub-lens groups which is located closest to the image side.

13. A zoom lens system according to claim 8, wherein at least one of a plurality of lens elements constituting said fourth lens group has an aspherical surface.

14. A zoom lens system according to claim 8, wherein said first and fourth lens groups do not move along the optical axis when the focal length of said zoom lens system changes from the wide-angle end to the telephoto end.

15. A zoom lens system comprising in the following order from the object side:

a first lens group of a positive refracting power provided so as to be fixed in a direction of an optical axis of said zoom lens system when changing a focal length of said zoom lens system from a wide-angle end to a telephoto end;

a second lens group with negative refracting power provided so as to be movable in one direction along the optical axis when changing the focal length of said zoom lens system from the wide-angle end to the telephoto end;

a third lens group provided so as to be able to reciprocate along the optical axis when changing the focal length of said zoom lens system from the wide-angle end to the telephoto end; and a fourth lens group that does not move along the optical axis when changing the focal length of said zoom lens system from the wide-angle end to the telephoto end, wherein said first lens group includes, in the following order from the object side, a negative lens element, a first positive lens element and a second positive lens element, and at least one of said first and second positive lens elements is a gradient index lens whose refractive index varies along the optical axis.

16. A zoom lens system according to claim 15, wherein said first positive lens element is said gradient index lens.

17. A zoom lens system according to claim 16, wherein said gradient index lens satisfies:

$$-10.6 < (v2-v1)/[(n2-n1) \cdot 100] < -0.9$$

wherein n1: a refractive index at an object-side vertex of said gradient index lens, n2: a refractive index at an image-side vertex of said gradient index lens, v1: Abbe number at the object-side vertex of said gradient index lens, v2: Abbe number at the image-side vertex of said gradient index lens.

18. A zoom lens system according to claim 15, wherein said second lens element is said gradient index lens.

19. A zoom lens system according to claim 18, wherein said gradient index lens satisfies:

$$0.4 < (v2-v1)/[(n2-n1) \cdot 100] < 1.8$$

wherein n1: a refractive index at an object-side vertex of said gradient index lens, n2: a refractive index at an image-side vertex of said gradient index lens, v1: Abbe number at the object-side vertex of said gradient index lens, v2: Abbe number at the image-side vertex of said gradient index lens.

* * * * *